US009183597B2

(12) United States Patent
Myers

(10) Patent No.: US 9,183,597 B2
(45) Date of Patent: Nov. 10, 2015

(54) MOBILE USER CLASSIFICATION SYSTEM AND METHOD

(75) Inventor: Jesse Myers, San Francisco, CA (US)

(73) Assignee: Location Labs, Inc., Emeryville, CA (US)

( * ) Notice: Subject to any disclaimer, the term of this patent is extended or adjusted under 35 U.S.C. 154(b) by 150 days.

(21) Appl. No.: 13/398,808

(22) Filed: Feb. 16, 2012

(65) Prior Publication Data

US 2013/0217363 A1 Aug. 22, 2013

(51) Int. Cl.

| | |
|---|---|
| ***H04M 3/42*** | (2006.01) |
| ***H04M 1/663*** | (2006.01) |
| ***H04W 4/00*** | (2009.01) |
| ***G06Q 99/00*** | (2006.01) |
| ***G06Q 50/00*** | (2012.01) |

(52) U.S. Cl.
CPC .................................... *G06Q 50/01* (2013.01)

(58) Field of Classification Search
CPC ...................................................... G06Q 50/01
USPC ................ 455/410–411, 412.1–412.2, 414.1, 455/418–420, 466; 726/26–30; 705/319
See application file for complete search history.

(56) References Cited

U.S. PATENT DOCUMENTS

| | | | | |
|---|---|---|---|---|
| 4,956,825 | A | 9/1990 | Wilts et al. | |
| 5,434,562 | A | 7/1995 | Reardon | |
| 5,882,258 | A | 3/1999 | Kelly et al. | |
| 5,973,683 | A | 10/1999 | Cragun et al. | |
| 6,023,692 | A | 2/2000 | Nichols | |
| 6,161,008 | A | 12/2000 | Lee et al. | |
| 7,257,367 | B2 | 8/2007 | Etuk et al. | |
| 7,729,945 | B1 | 6/2010 | Katz et al. | |
| 7,849,502 | B1 | 12/2010 | Bloch et al. | |
| 7,869,792 | B1 | 1/2011 | Zhou et al. | |
| 7,996,005 | B2 | 8/2011 | Lotter et al. | |
| 8,185,953 | B2 | 5/2012 | Rothstein et al. | |
| 8,225,413 | B1 * | 7/2012 | De et al. | 726/26 |
| 8,279,808 | B2 | 10/2012 | Sing et al. | |
| 8,661,123 | B2 | 2/2014 | Nishiyama | |
| 2002/0012894 | A1 | 1/2002 | Becker | |
| 2002/0049806 | A1 | 4/2002 | Gatz et al. | |
| 2003/0005306 | A1 | 1/2003 | Hunt et al. | |
| 2003/0126267 | A1 | 7/2003 | Gutta et al. | |
| 2003/0211889 | A1 | 11/2003 | Walker et al. | |

(Continued)

FOREIGN PATENT DOCUMENTS

| | | | |
|---|---|---|---|
| FR | 2863439 | A1 | 6/2005 |
| WO | WO 2011137279 | | 11/2011 |

OTHER PUBLICATIONS

"Net Nanny Parental Controls User Guide", 2007, ContentWatch, Inc, http://www.netnanny.com/assets/documentation/nn/netnanny_56.pdf, pp. 53-60.

*Primary Examiner* — Michael Mapa
(74) *Attorney, Agent, or Firm* — Dovas Law, P.C.

(57) ABSTRACT

A system and method of classifying historic and real-time social contacts of one or more mobile users in such a manner that classification structures are implemented. Those classification structures are maintained in a database and updated with additional information that can either be found or heuristically inferred. The maintained classification structures can be searched to obtain information or used to send alerts that notify others of a change in a social network, such as an alert to a parent when their child's social network changes.

45 Claims, 6 Drawing Sheets

(56) References Cited

U.S. PATENT DOCUMENTS

2004/0111479 A1 6/2004 Borden et al.
2005/0003895 A1 1/2005 Nara
2006/0085419 A1* 4/2006 Rosen ............................... 707/9
2006/0270476 A1 11/2006 Denkewicz
2007/0039624 A1 2/2007 Roberts et al.
2007/0203872 A1 8/2007 Flinn et al.
2007/0277224 A1 11/2007 Osborn et al.
2008/0005325 A1 1/2008 Wynn et al.
2008/0066020 A1 3/2008 Boss et al.
2008/0199199 A1 8/2008 Kato et al.
2008/0201441 A1* 8/2008 Bodic et al. ................... 709/206
2008/0201469 A1 8/2008 Reasor et al.
2008/0270038 A1 10/2008 Partovi et al.
2008/0294589 A1* 11/2008 Chu et al. ........................ 706/55
2009/0017750 A1 1/2009 Marcinkiewicz
2009/0055938 A1 2/2009 Samuel
2009/0064316 A1 3/2009 Liao et al.
2009/0089876 A1 4/2009 Finamore et al.
2009/0125499 A1 5/2009 Cross et al.
2009/0181356 A1 7/2009 Dasgupta
2009/0204471 A1 8/2009 Elenbaas et al.
2009/0248436 A1* 10/2009 Takagi et al. ..................... 705/1
2009/0260064 A1 10/2009 McDowell et al.
2009/0271247 A1* 10/2009 Karelin et al. .................. 705/10
2009/0286218 A1 11/2009 Johnson et al.
2009/0298019 A1 12/2009 Rogan et al.
2009/0327150 A1 12/2009 Flake et al.
2010/0028844 A1 2/2010 Wiseman
2010/0042684 A1 2/2010 Broms et al.
2010/0077444 A1 3/2010 Forristal
2010/0100398 A1* 4/2010 Auker et al. ...................... 705/4
2010/0100618 A1 4/2010 Kuhlke et al.
2010/0106573 A1* 4/2010 Gallagher et al. ........... 705/14.4
2010/0145976 A1 6/2010 Higgins et al.
2010/0211694 A1 8/2010 Razmov et al.
2010/0211887 A1 8/2010 Woollcombe
2010/0235223 A1 9/2010 Lyman
2010/0246797 A1 9/2010 Chavez et al.
2010/0250352 A1 9/2010 Moore
2010/0268768 A1 10/2010 Kurtenbach et al.
2010/0317420 A1 12/2010 Hofberg
2010/0330543 A1* 12/2010 Black et al. ................... 434/236
2011/0040586 A1* 2/2011 Murray et al. .................... 705/7
2011/0047078 A1 2/2011 Ginter et al.
2011/0125844 A1 5/2011 Collier et al.
2011/0218884 A1 9/2011 Kothari et al.
2011/0236872 A1 9/2011 Taylor
2011/0289161 A1 11/2011 Rankin et al.
2011/0296014 A1* 12/2011 Cancel et al. ................. 709/224
2011/0302003 A1 12/2011 Shirish et al.
2011/0307434 A1* 12/2011 Rostampour et al. ........... 706/45
2012/0047448 A1 2/2012 Amidon et al.
2012/0047560 A1 2/2012 Underwood et al.
2012/0069131 A1 3/2012 Abelow
2012/0102008 A1 4/2012 Kaariainen et al.
2012/0110071 A1* 5/2012 Zhou et al. .................... 709/204
2012/0131161 A1 5/2012 Ferris et al.
2012/0151045 A1 6/2012 Anakata et al.
2012/0151046 A1 6/2012 Weiss et al.
2012/0151047 A1 6/2012 Hodges et al.
2012/0166285 A1* 6/2012 Shapiro et al. ............. 705/14.58
2012/0171990 A1* 7/2012 Williams et al. .............. 455/406
2012/0172100 A1 7/2012 Colar et al.
2012/0180135 A1 7/2012 Hodges et al.
2012/0253918 A1 10/2012 Marois et al.
2012/0254949 A1 10/2012 Mikkonen et al.
2012/0280916 A1 11/2012 Xia et al.
2012/0323990 A1 12/2012 Hayworth
2013/0054674 A1 2/2013 Myers et al.
2013/0091453 A1 4/2013 Kotler et al.
2013/0104246 A1 4/2013 Bear et al.
2013/0111510 A1 5/2013 Baker et al.
2013/0305384 A1 11/2013 Weiss
2014/0310403 A1 10/2014 Weiss et al.

* cited by examiner

MOBILE USER CLASSIFICATION SYSTEM AND METHOD

FIELD OF INVENTION

This invention relates to mobile communications. More particularly this invention relates to classifying mobile users using historic and real-time user interactions along with other information that can be found or inferred, and then using such classifications to improve the user experience.

BACKGROUND

Mobile devices such as cellular telephones, smart phones, GPS systems, and cellular-enabled personal computers have become very common and very powerful. This combination of ubiquity and capability has created an ongoing demand for improved devices and unique applications. While applications currently exist for games, social networking, navigation, locating points of interest, location tracking, specialized advertising, and consumer and business-related services, even more capable, unique, and customizable applications are in demand.

A typical mobile device operates on a communication network that is provided by a mobile telephone operator. Such communication networks provide communication links and basic services such as time keeping and access to the public telephone network. A typically state-of-the-art mobile device, sometimes referred to as a smartphone, can have built in features such as communication ports, touch screen displays, keyboards, orientation sensors, accelerometers, cameras, one or more timers, microphones, audio outputs, memory card readers, significant internal memory, and specialized software. Such mobile devices can provide a wide range of functionality such as telephone communications, texting, calendars, alarms, memo and note recording, GPS navigation, music (MP3) and video (MP4) playback, video calling, conference calling, movie playback, picture taking and sending, games, e-mails, audio and video downloading, internet access and browsing, short range communications such as Bluetooth™, mobile banking, instant messaging and the ever-popular specialized ringtones.

Mobile devices are often used to connect a user to his or her social network. A social network as used herein denotes a social structure of contacts, referred to hereinafter as "nodes" that are connected to the user by some type of an interdependent relationship tie. An example of a social network would be a user's family, friends, classmates, religious affiliates, co-workers, teammates, and those having similar or overlapping interests, likes, and dislikes as that user and with which the user commonly socially interacts.

Social networks are inherently highly dynamic structures that can be subjected to a wide range of analyses using sociological network theory. In such analysis a network tree can be formed in which the various individuals are nodes while the relationships are ties. As the number of nodes increases, the network tree can grow dramatically in complexity. However, the social network of a single user can often provide a foundation for understanding just how that user functions in society, solves problems, succeeds or fails, and can help explain how a user's set of beliefs is formed and modified.

As noted above, social network are highly dynamic. Not only can major changes in a user's life, such as graduation, marriage, enlistment, a new job, or a change in location cause fundamental changes to a social network, but even relatively minor changes, such as a new interest or activity or the loss of an old one can be important.

Properly analyzed, a social network has applications to very wide ranges of activities, such as safety, marketing, and fraud detection. For example, sudden changes in a child's social network can raise safety concerns for their parents; a marketing recommendation from someone in a user's social network can be highly effective in inducing that user to try a product or service; and, if a particular social network is properly classified, that classification can provide a measure of trustworthiness in a financial transaction or suggest a false identity.

SUMMARY

The invention implements a classification system for use with a cellular infrastructure. A mobile device having features and settings and on the cellular infrastructure sends at least one action to an input manager, where the action impacts on a profile classification, a relationship classification, and/or a network classification. The action is applied to a classification manager which updates at least one of the profile classification, relationship classification, or network classification in response to the action. The profile classification, relationship classification, and network classification are stored in a database. An alert subsystem can be implemented to generate alerts based on the content of the profile classification or on the content of the relationship classification and the network classification. The invention may further include a query subsystem for interrogating the database to obtain information.

Beneficially the input manager can obtain information from the cellular infrastructure and/or from an external source. In either event the newly obtained information is applied to the classification manager which updates at least one of the profile classification, relationship classification, and network classification. Additional information can be obtained by applying heuristics to available information. In practice at least the input manager can be contained within the mobile device, which may also include a client manager that controls the various features and settings of the mobile device.

The invention also provides for a method of classifying social network contacts. The method initially awaits a social contact action that impacts on a classification. After a social contact action occurs, a profile classification, a relationship classification, and a network classification are updated based on the social contact action. Additional information relating to at least one of the profile classification, relationship classification, and network classification can be obtained from cellular infrastructure. The profile classification, relationship classification, and network classification are then updated using a heuristic assumption based on all available information. Then, a query based on at least one of the profile classification, relationship classification, and network classification is answered. Alerts based on at least one of the profile classification, relationship classification, and network classification can be sent.

The invention includes computer readable storage media containing coded instructions that implement a mobile device having features and settings on a cellular infrastructure. Those coded instructions further form an input manager for receiving at least one action from the mobile device and that put into operation a database this is operatively storing a profile classification, a relationship classification, and a network classification. Those coded instructions further produce a classification manager that is operatively connected to the input manager for receiving at least one action, wherein the classification manager updates at least one of the profile classification, relationship classification, or network classification on the database in response to the at least one action. The at least one action is any one of a set of acts that impact on the profile classification, the relationship classification, or the network classification.

Those coded instructions can further create an alerts subsystem for generating alerts based on content of the profile classification or on the content of the relationship classification or the network classification.

The inventive coded instructions can further implement a query subsystem for interrogating the database to obtain information from the database. The coded instructions may also cause the input manager to obtain information from the cellular infrastructure or from external sources. In either event the newly obtained information is used by the classification manager to update at least one of the profile classification, the relationship classification, and the network classification. Heuristic information can also be obtained if possible. Beneficially the coded instructions are such that the input manager is contained within the mobile device along with a client manager that controls features and settings of the mobile device.

BRIEF DESCRIPTION OF THE DRAWING(S)

The foregoing Summary as well as the following detailed description will be readily understood in conjunction with the appended drawings which illustrate embodiments of the invention. In the drawings.

Figure 4:
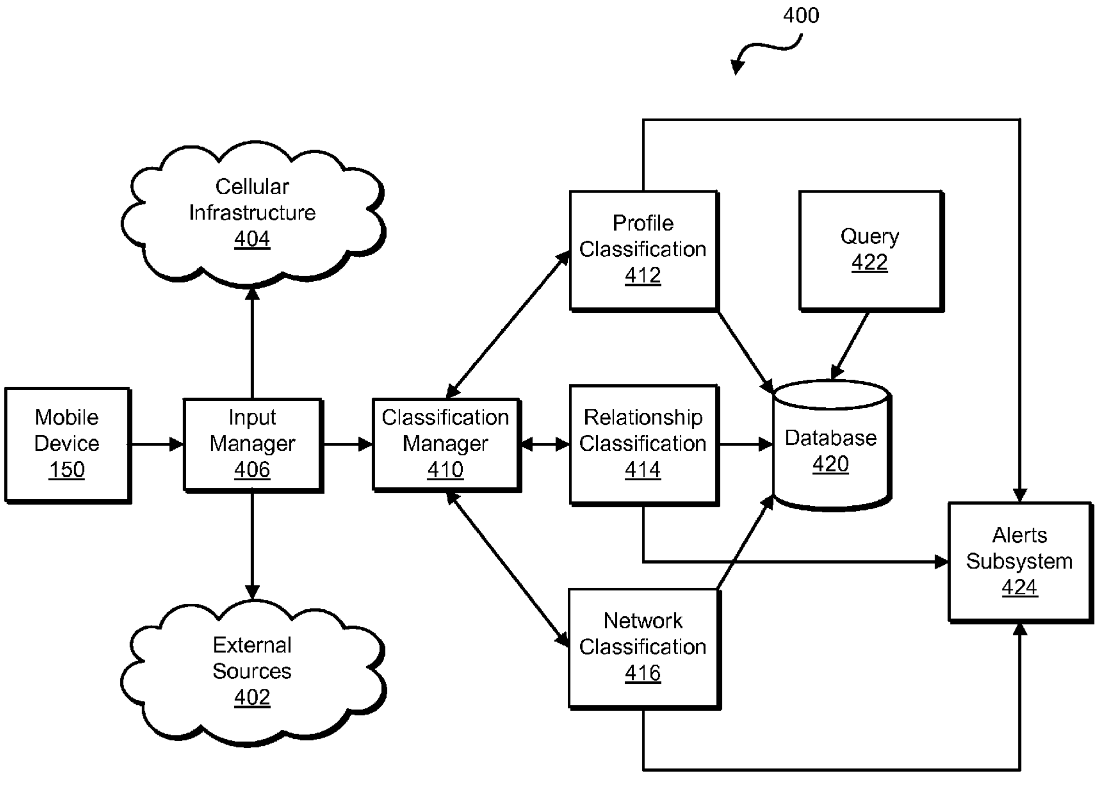
Figure 5A:
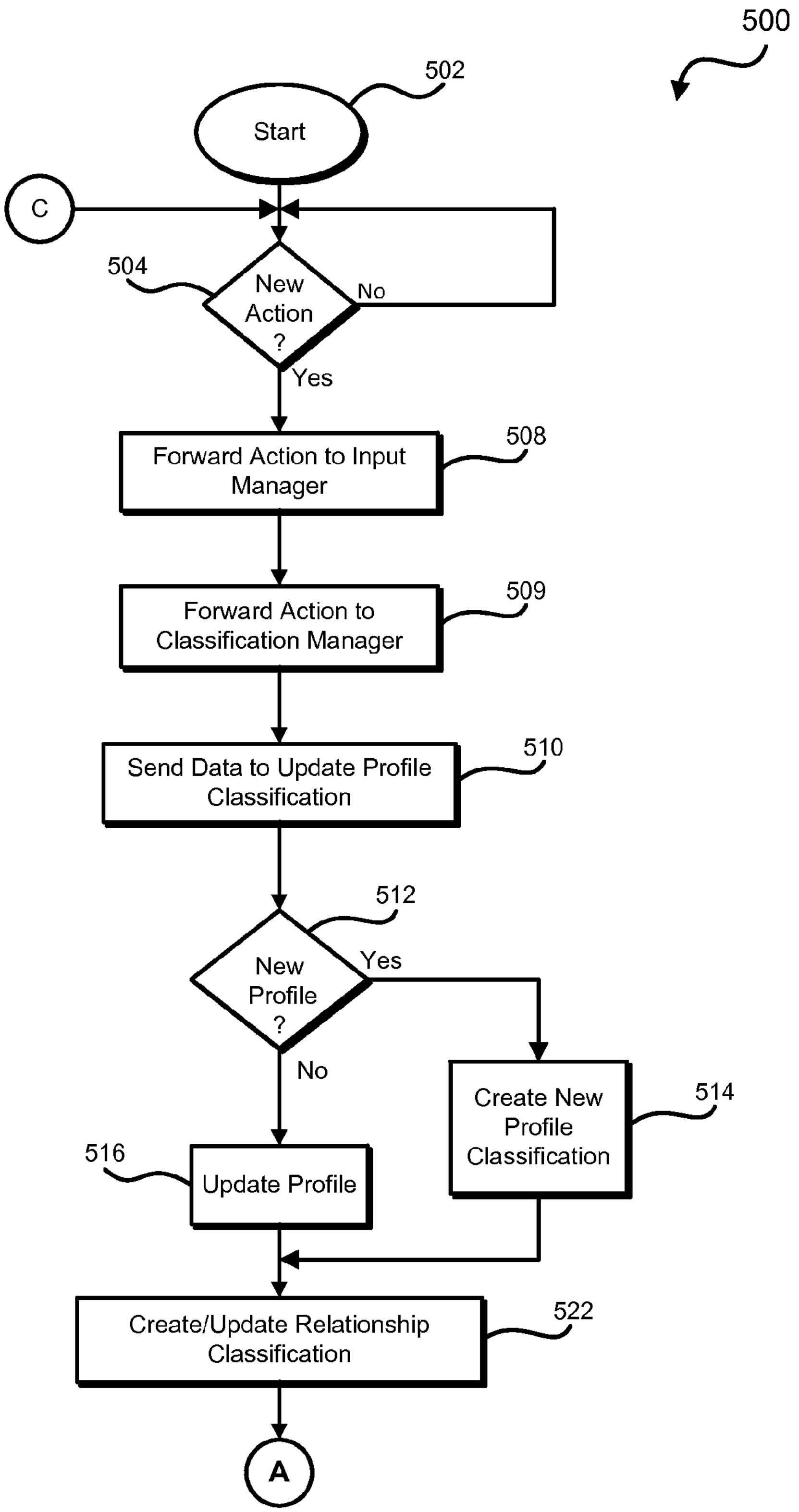
Figure 5B:
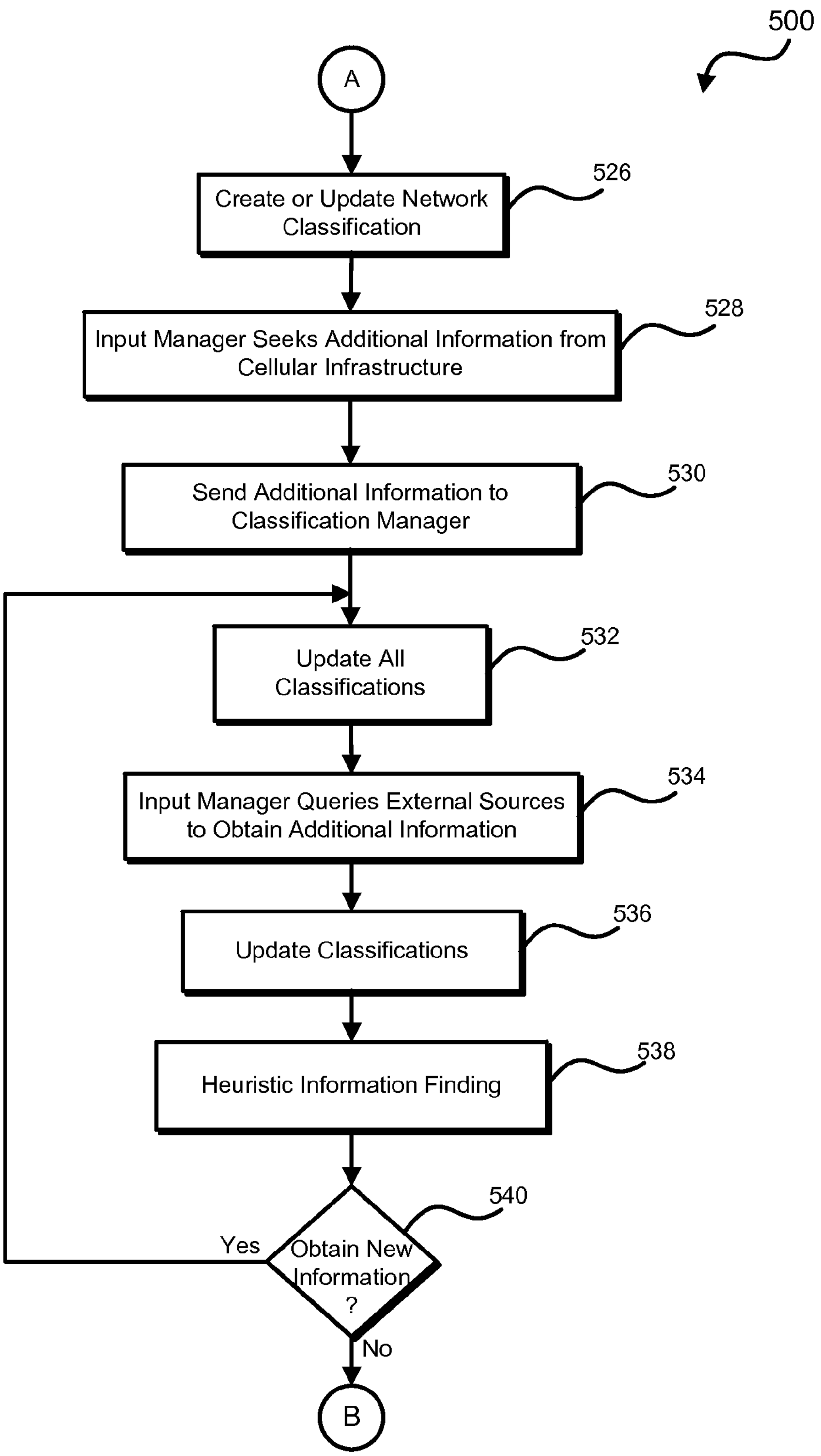
Figure 5C:
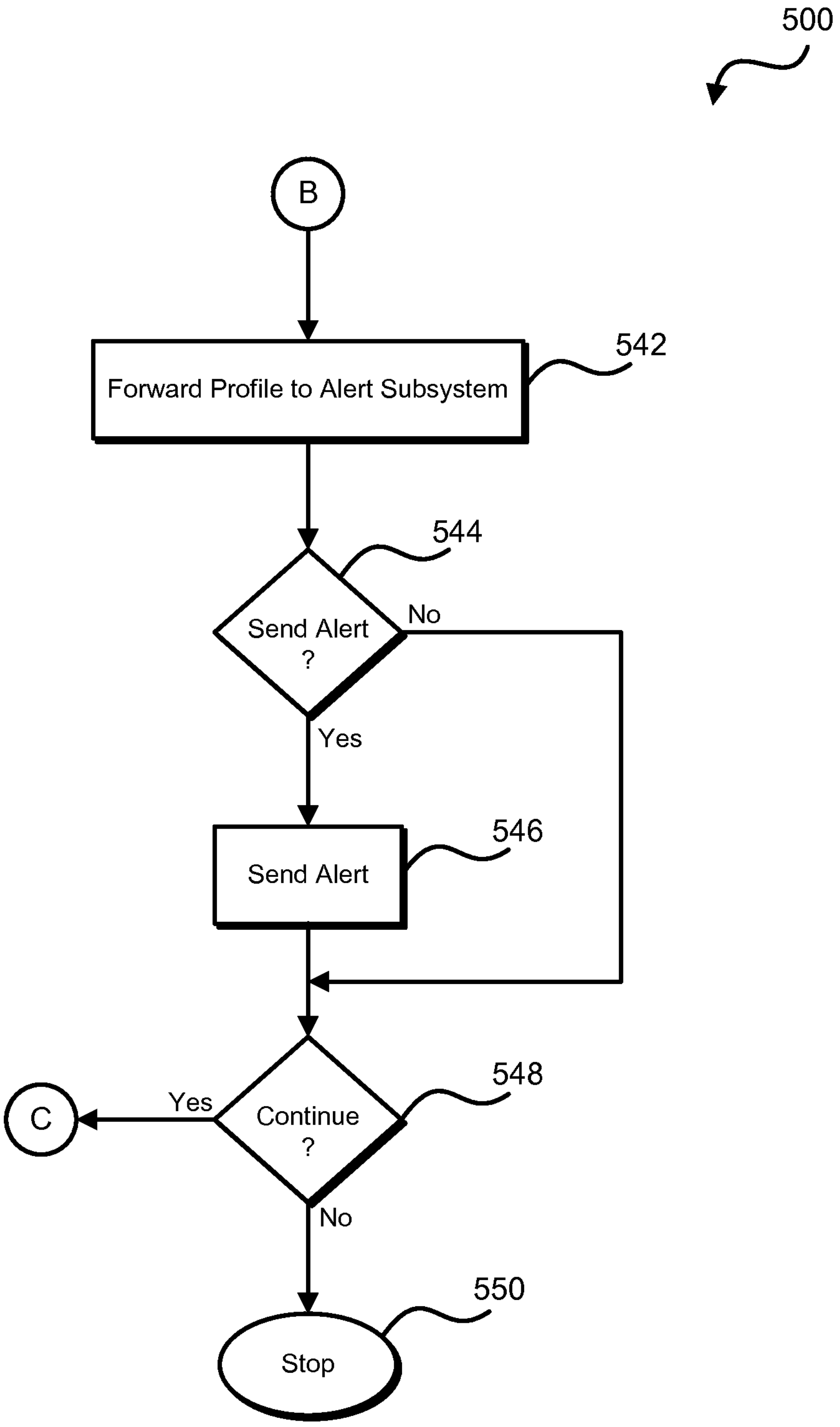

FIG. 4 provides a schematic topology of the functional components of the invention;

FIG. **5*a*** presents a flow diagram of part of the functional operation of the invention;

FIG. **5*b* presents a flow diagram of another part of the functional operation of the invention; and FIG. 5*c*** presents a flow diagram of yet another part of the functional operation of the invention.

DETAILED DESCRIPTION OF ILLUSTRATIVE EMBODIMENT(S)

The disclosed subject matter will now be described more fully hereinafter with reference to the accompanying drawings. However, it should be understood that this invention may take many different forms and thus the invention should not be construed as being limited to the specific embodiments set forth herein.

In the figures like numbers refer to like elements. Furthermore, the terms “a” and “an” as used herein do not denote a limitation of quantity, but rather denote the presence of at least one of the referenced items. All documents and references referred to herein are hereby incorporated by reference for all purposes.

Figure 1:
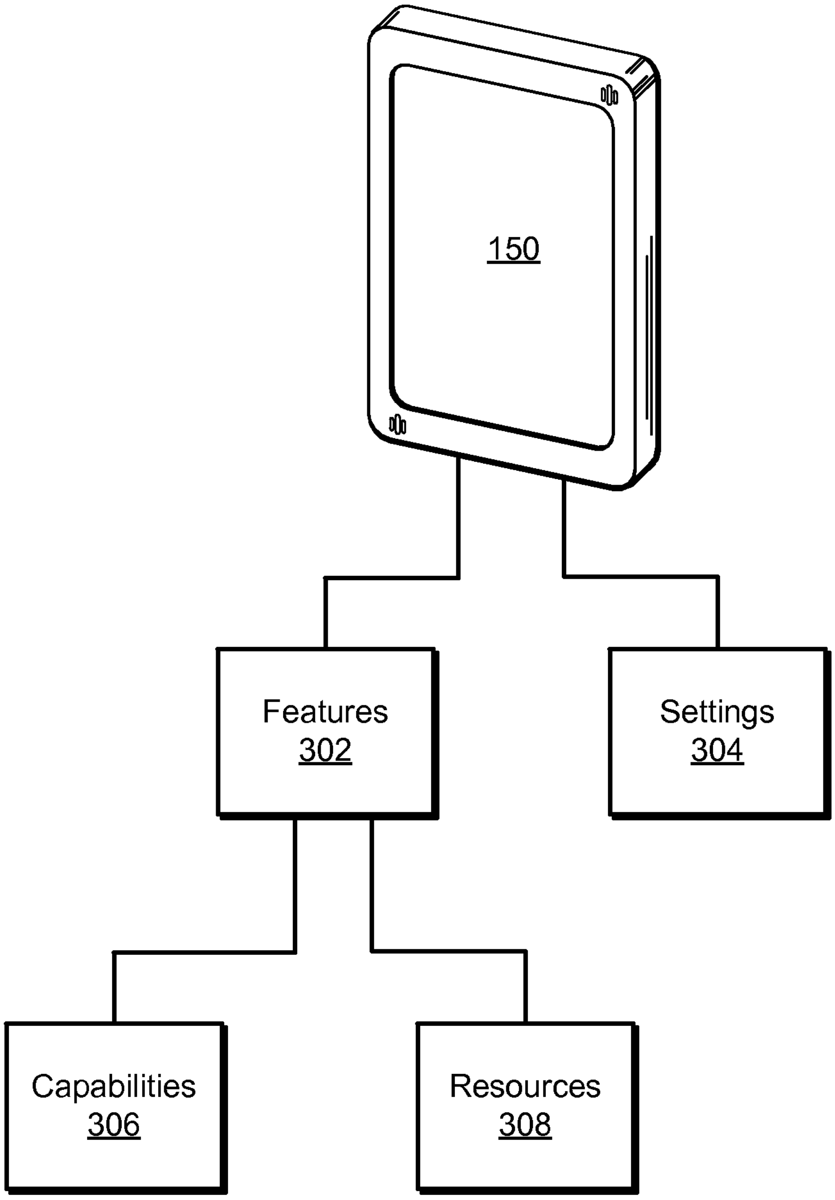
FIG. 1 is a schematic depiction of a prototypical mobile device having a plurality of features, settings, capabilities and resources.

Refer now to FIG. 1 for a schematic illustration of a prototypical mobile device 150 that is suitable for use with the invention. The mobile device 150 can be implemented to enable a variety of features 302, settings 304, capabilities 306 and resources 308. A user can set up the mobile device by adjusting the settings 304, such as sound levels, visual intensity levels, dates, times, timers, calendars, contact lists, contact groupings, speed dials, tools, and clock settings. In addition, application software can check and/or set up the features 302, settings 304, capabilities 306 and resources 308 as required to perform its programmed task.

Typical features 302 can include calling, group calling, texting, messaging, internet access, call tracking, message waiting, games, sound playback and recording, visual playback and recording, application software selection and loading, location finding, directional guidance and a large and ever growing list of other possible features.

Figure 2:
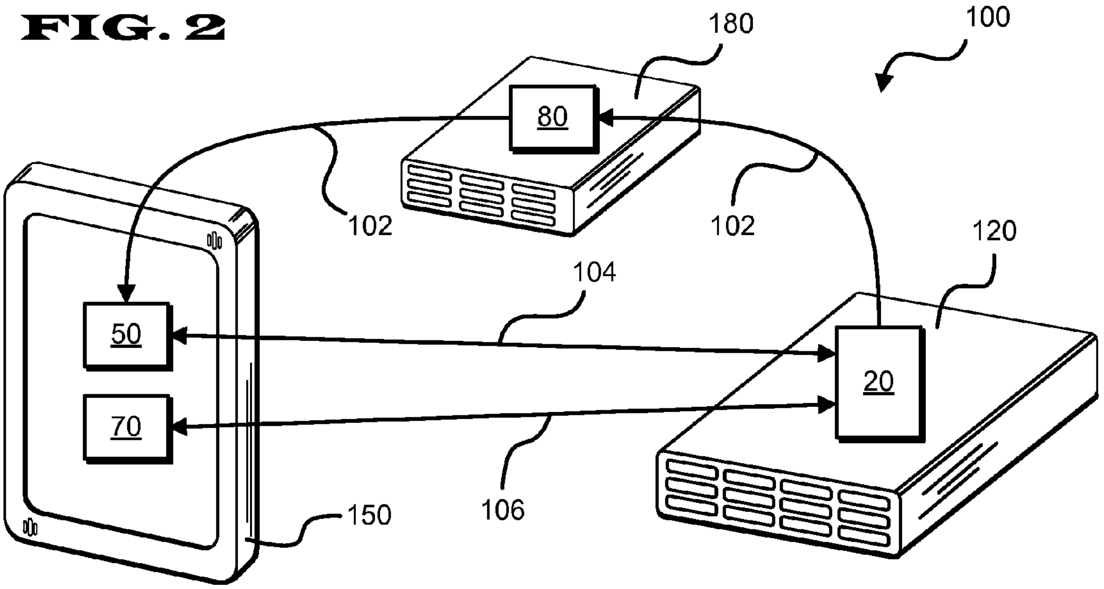
FIG. 2 depicts a prototypical implementation of a communication network in which application software is implemented in a mobile device.
Figure 3:
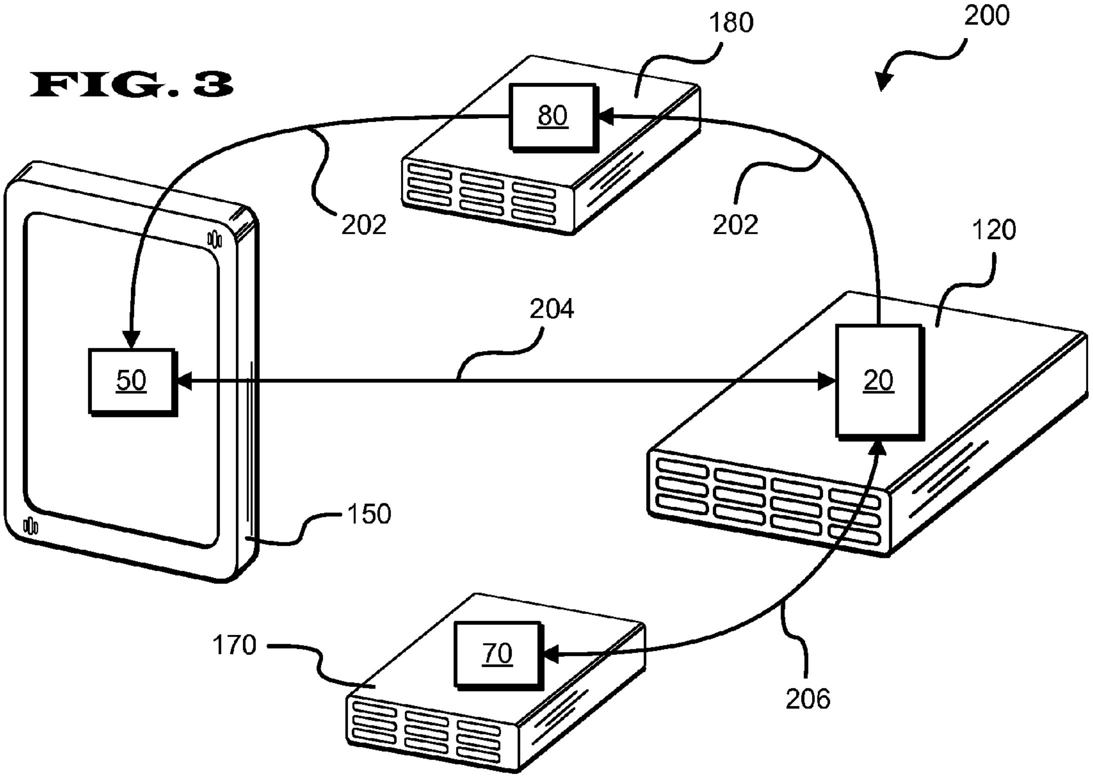
FIG. 3 depicts a prototypical implementation of a communication network in which application software is implemented in an external device.

The mobile device 150 typically operates both under the direction of application software and as part of a communication network. FIG. 2 depicts a prototypical implementation of a communication network 100 in which application software 70 is implemented within the mobile device 150, while FIG. 3 depicts a prototypical communication network 200 in which the application software 70 is implemented in an external device 170. Having access to a communication network 100, 200 provides a port into a cellular infrastructure 404 of the communication network 100, 200. That is the operator of the communication network 100, 200 provides a mechanism by which information about the cellular network becomes available (subject to access rights granted by the cellular network operator), such as access into the sales department, accounting department, and various databases.

In FIG. 2, in addition to the application software 70, the mobile device 150 includes a client state manager 50 that controls most or all of the various features 302, settings, 304, capabilities 306 and resources 308 of the mobile device 150. The client state manager 50 effectively controls the mobile device 150 to implement various functions. In addition, the communication network 100 includes a server state manager 20 located on state server 120 that controls the overall operation of the communication network 100. In practice the server state manager 20 can control all or at least some actions of the client state manager 50. The communication network 100 also beneficially includes a message aggregation server 180 that implements a message aggregator 80, for example a Short Message Service (“SMS”) aggregator or a Short Message Service Center (“SMSC”) using asynchronous communication 102, for example SMS messages, from the server state manager 20 to the client state manager 50, for example via a wireless telecommunications network. Additionally, the communication network 100 supports synchronous communications 104, 106, for example HTTPS, between the client state manager 50 and the server state manager 20 and between the third party application 70 and the server state manager 20, respectively.

While the communication network 100 is highly useful it may not always be optimal. For example, the application software 70 may interact with other users and/or may require memory and central processing power not readily available on the mobile device 150. FIG. 3 shows a communication network 200 in which the application software 70 resides on a separate application server 170 that is in communication with the server state manager 20 on the state server 120, for example via a data network. In the communication network 200 the message aggregation server 180 and message aggregator 80 disseminate asynchronous communications 202, for example SMS messages, from the server state manager 20 to the client state manager 50 on the mobile device 150 while synchronous communications 204, 206 are initiated between the client state manager 50 and the server state manager 20 and between the application software 70 and the server state manager 20, respectively.

It should be understood that the mobile device 150 and the communication network 100 or 200 enable a user to interact with his/her social network. That is, the mobile device 150 and communication network 100 or 200 act as a port into the user's social network. According to the invention the mobile device 150, application software 70, and communication network 100 or 200 are monitored and used to gather both historic and real-time information about the user's contacts (social nodes) and his/her messaging interactions (tree branches) with those contacts. The invention uses such information in conjunction with other available information from external sources and the cellular infrastructure to build various classifications of user profiles, relationships, and social networks. Those classifications are stored in a database and then analyzed to provide insights into the user relationships. Queries can be made of the information in the database to assist marketing and detecting changes in the user's social networks. Alerts, either in response to queries or automatically upon predetermined criteria can be sent to appropriate entities, such as parents.

While FIGS. 1-3 illustrate a mobile device 150 and communication networks 100, 200 useful for implementing the invention, FIG. 4 provides a schematic depiction of a system topology 400 of the functional components of the invention. The system topology 400 should be understood as being at a higher abstraction layer than the features depicted in FIGS. 1-3, which can be used not only to practice the invention but also to practice many other functions. It should also be understood that the functional components of the system topology 400 can be implemented in any combination of the devices and features depicted in FIGS. 1-3. For example, all of the functional components except the mobile device 150, external sources 402, and a cellular infrastructure 404 might be implemented only in the mobile device 150, only in the state server 120 or only in the application server 170, or in some combination of the mobile device 150, state server 120, and application server 170. Thus the invention can be diffused over multiple hardware devices and software functions. Finally, it should be understood that the user of the mobile device 150 is part of a social network and that the mobile device 150 acts as a port into that social network.

The invention relates to gathering user contact and messaging data, building user profiles, relationships, and social network classifications, and providing access to the constructed data model using queries and alerts.

Referring now to FIG. 4, the system topology 400 includes the mobile device 150 which is in contact with an input manager 406. The input manager 406 via application software can access the user's contacts, including phone numbers, email addresses, contact names, etc. that are stored in the mobile device 150. The input manager 406 can also obtain information about interactions between the user via the mobile device 150 with these contacts (via SMS, voice, MMS, etc.). That interaction information can either be obtained by accessing the mobile device's 150 historic records or by monitoring such interactions in real time and then storing them for future use.

The input manager 406 can also, via application software, gather content payload data for these messages (e.g. SMS text). Since it is often a violation of privacy policies to gather such data in raw form, the mobile device 150 via client software or the input manager 406 via application software may implement content processing functions that transform privacy protected raw data into a less privacy-sensitive form. For example, text can be normalized using stemming and hashing functions and then processed with a set of rules to generate pre-defined classifications as discussed in more detail subsequently.

The information available from the mobile device 150 can be augmented by having the input manger 406 gather data from the cellular infrastructure 404. For example, information known to the cellular infrastructure 404 accounting system can be cross-referenced with cellular account information to obtain information about others that are related to the user because two people on the same cellular account are likely to be related. Additional cross-referencing using things such as mailing addresses, messaging platforms, and itemized bills can be data mined to obtain additional information about the user's social network.

Information can be further improved by using data from external sources, for example searching a social network using a contact's phone number or email address to obtain demographic information and additional relationships. Therefore, the input manger 406 can also make use of a variety of external sources 402, such as web addresses, web search cookies, Facebook accounts, finance records such as credit reports and bankruptcy filings, court records, and phone directories to obtain more information about a user, his contacts, and his social network.

All of the information obtained by the input manager 406 is processed by a classification manager 410 using any of a wide variety of known machine learning and data mining techniques to produce a user profile classification 412, a user relationship classification 414, and a user network classification 416. Those classifications enable the topology network 400 to infer facts about the users, his relationships, and his networks.

The user profile classification 412 can include information related to the user's age, gender, popularity, school or workplace, frequency of messaging, frequency of calling, travel, location, workdays, work hours and so on. Inputs from various sources can be processed to generate profiles for each user and store them in a database as the profile classification 412. Profiles include a collection of attributes, wherein each attribute preferably includes a name, one or more values, a confidence measurement (as a probability), and a record of where the attribute was obtained. Attributes can include data directly obtained from input sources—in which case, the confidence measurement is high—or can consist of inferences drawn from these or other data.

For example, a profile can include contact data and messaging activity obtained directly from mobile software, age and gender data obtained from a social network, and account data obtained from a cellular network infrastructure, which information corresponds to relatively high confidences. It should be understood that the various profiles need not be derived directly from factual information, but may include assumptions derived from available information. A profile can also include inferences as to the user's age, gender, or occupation, with confidences based on the method of estimation. Inferences can be computed using machine learning and heuristics. Machine learning allows users with similar profiles to be clustered and attributes estimated from those of similar users. For example, a user's age can be estimated from the frequency, timing, or content of their messaging activity or using their academic or professional status. Heuristics allow more specific rules to be applied based on general knowledge, for example estimating a user's age range based on the knowledge that they attend a high school. Beneficially all profiles are enhanced over time using additional information that becomes available and new assumptions made by machine learning and heuristics.

The relationship classification 414 can include information about the user's social relationships such as close friends, co-workers, employer, and social status. User profiles, and especially user interaction history, can be processed to compute the relationships between users, which relationships are stored in a database as the relationship classification 414. Similar to user profiles, relationships include attributes based on available data and drawn inferences. In particular, the types, frequency, content, and timing of message activity and other interactions along with profile information can be used to characterize relationships. For example, clustering can be used to group together parent-child relationships and differentiate them from friendships, professional relationships, or other social relationships. Clustering can be especially effective if a known sample's communication characteristics (e.g. of a parent-child relationship) are studied in advance. Furthermore, heuristics can be used to compute the strength of a relationship based on message frequency and timing. Such heuristics can for example determine that: 1) relationships with more frequent messaging are likely to be closer; 2) relationships with periodic messaging over a long duration are likely to be strong. 3) relationships with long voice calls during school hours are likely to be between adults (because school rules will generally prohibit such calls); and 4) relationships with bi-directional messaging activity during night-time hours are likely to be closer (because willingness to accept a call at night indicates trust, or at least obligation).

The network classification 416 can include information about how the user uses his relationships and how the user socially interacts with others. The collection of relationships for a particular user can be processed to generate a collection of attributes of the user's social network, with machine learning and heuristics applied to generate inferences, which attributes are stored in a database as the network classification 416. Because there are relatively fewer commonly recognized attributes for social networks, clustering plays an especially important role in the classification of social networks. Clustering includes determining which other social networks have similar number, type, strength, closeness, and other aspects in their relationships, wherein similar social networks are designated, for example networks of similar parents within parent-child relationships. Determining outlier social networks, including those social networks with few or no similar counterparts, also provides useful information, as does determining changes in a social network's clustering.

The user profile classification 412, user relationship classification 414, and user network classification 416 and the information from which they are derived are preferably stored in a database 420.

It is beneficial to form profiles on a large number of users. Once that is accomplished users with similar profiles, especially with similar messaging activity, can be clustered together. Furthermore, multiple user profiles and user interaction histories can be processed to generate and augment a particular user's profile classifications, user relationship classifications, and user networks classifications, all of which are stored in the database 420. The types, frequency, content, and timing of interactions along with the profile classification 412 information can be used to characterize these relationships, for example differentiating a parent-child relationship from a friendship or a business relationship, as well as differentiating a strong/close relationship from a weaker/estranged one.

Relationship classifications across multiple users can further strengthen characterizations. For example, a relationship with similar interaction patterns to known parent-child relationships may be used to assume a parent-child relationship while a willingness to accept a call at 4 a.m. indicates another type of relationship.

All of a user's relationships can be processed to model the user's social network, including the number and types of relationships a user has, and store the results in the database 420. Social networks can, in turn, be classified against other networks to identify similar networks, e.g. all parent-child relationships.

An important aspect of the invention is iteratively refining a user's classifications by allowing feedback from each classification type into the others. For example, a user relationship classification 414 similar to that of a known parent-child relationship can be used to improve a user's profile classification by estimating age. Likewise, a user social network classification 416 similar to social network classifications of known children can be used to help identify a parent-child relationship in the relationship classification.

The system topology 400 includes several interactions with the classifications 412-416 and the database 420. Such interactions provide outputs for the system topology 400 and provide reasons for classifications. In particular the system topology 400 includes software that implements a query 422 function that enables the profile, relationships, and network classifications to be queried (subject to consent and suitable privacy parties) to obtain information. Queries provide external access to user demographic estimates, known relationships and their classifications, and social network characterizations.

One set of queries can enable a parent to identify a child's closest relationships and their outlying relationships. Another set of queries can be used to evaluate the type and strength of a marketing partner's relationships or to evaluate the social network of an online seller before purchasing a product or service. Proper queries can also help identify the potential for fraud and can be useful for fraud detection.

While queries are useful, they can beneficially be augmented by software that sends alerts 424 in response to changes to profiles, relationships, and networks over time. Alerts provide warnings about important real-world events, such as when a child suddenly begins interacting with an older stranger, when existing relationships become more hostile (via analysis of messaging content), or when a social network suddenly changes due to identity theft. Alerts 424 can be sent in response to queries or other programming to external or internal entities.

FIGS. 5*a* through 5*c* present the functional operation 500 of the invention, which will be illustrated in the context of a specific user and a specific event. The functional operation 500 starts, step 502, and proceeds to a determination as to whether a new action has occurred, step 504. An action is any act that initiates the functional operation 500 to update one or more profiles (as described subsequently). If a new action has not occurred, step 504 repeats until one does. For example, a user Alice sends an SMS to someone named Bob for the first time and then adds his name to her phone's contact list.

In response to the action, the functional operation 500 sends information about that action to the input manager 406, step 508. The input manager 406 then forwards the new action to the classification manager 410, step 509. The classification manager 410 then updates the appropriate profile classifications 412, step 510. In the specific example, Alice's profile classification would be updated to reflect the new interaction with Bob. A determination also made as to whether a new profile classification 412 is needed, step 512. If yes, a new profile classification is added, step 514. For example if Bob does not have a profile classification 412, the functional operation 500 proceeds to create one. If in step 512 the determination is made that a new profile classification 412 is not needed, the functional operation 500 attempts to update other suitable profile classifications 412, step 516. For example, if Bob had a profile classification 412 it is updated.

Creating or updating a profile classification 412, steps 514, 516, may include making use of heuristics to estimate or assume information. In the specific example it might be assumed that Bob is a male based on his name. Heuristic-based techniques for obtaining information can be rules of thumb, educated guesses, and logically or statistically derived information.

Next, the classification manager 410 creates or updates all suitable relationship classifications 414, step 522. In the specific example being described the classification manager 410 would update the relationship classification 414 to generate a new relationship between Alice and Bob, and vice versa.

Next the classification manager 410 creates and/or updates the network classifications 416, step 526. In the illustrated example the classification manager 410 would generate a new network classification for Bob and update the network classification for Alice.

Once the classification manager 410 has created or updated the various classifications, the input manager 406 seeks additional information from the cellular infrastructure 404, step 528. In the specific example being illustrated the input manager 406 would seek additional information about Bob, for example his cellular account number.

Any additional information obtained over the cellular infrastructure 404 would be sent to the classification manager 410, step 530. The classification manager 410 would then update the profile classifications 412, the relationship classifications 414, and the network classifications 416 with the additional information and any information that can be derived from that new information, step 532.

In the specific example being illustrated the classification manager 410 would forward Bob's cellular account number to his relationship classification 414 and Alice's relationship classification 414 and would update both classifications to indicate whether or not they are not on the same plan. The classification manager 410 would also update Bob's network classification 416 and the profile classifications of Alice with the new information.

After step 532 the input manager 406 would query external sources 402 to obtain still more information, step 534. In the specific example being illustrated the input manager 406 might query a high school record database to determine that Bob attends Central High School. The input manager 406 then forwards the information obtained from the external sources 402 to the classification manager 410 which then causes the various classifications to be updated, step 536. In addition, heuristic information finding would be performed using all available information, step 538.

In the specific example being illustrated the classification manager 410 updates the new school information in Bob's profile classifications 412. The profile classification 412 can also use a heuristic to estimate Bob's age as being between 14 and 18, based on his attending high school.

The classification manager 410 also forwards the newly available school information to the relationship classifications 414 for both Alice and Bob using a heuristic to determine that Alice and Bob are classmates, since Alice also attends Central High School and is between 14 and 18 years old. The relationship classification 414 would further determine that Alice and Bob are unlikely to be siblings based on their both being minors and not being on the same cellular plan.

The classification manager 410 would also feed the newly developed relationship information back to Bob's profile classifications 412, which would raise its confidence in Bob's age estimation based on his contact with Alice. The classification manager 410 would also feed the updated relationship information to the network classification 416, which would then update Alice and Bob's networks.

After step 538 a determination is made as to whether new information can be readily obtained, step 540. If yes, a loop is made back to step 532. But, if new information cannot be readily obtained, the functional operation 500 proceeds by submitting the various profiles to an alerts subsystem 424. The alerts subsystem 424 compares the profiles in the profile classification to determine whether an alert should be sent, step 544. If yes, an alert is sent, step 546.

In the specific example being illustrated the alerts subsystem 424 might be programmed to forward any information about changes to Alice's profile to Alice's parents. In that case, Alice's updated profile classification that reflects Bob as a new contact is sent to Alice's parents.

But, if in step 544 an alert is not to be sent, or after the alert is sent in step 546, a decision is made as to whether the functional operation 500 should continue, step 548. If yes, the functional operation 500 returns to step 504 to await a new action. If not, the functional operation 500 stops, step 550.

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computerized classification system comprising:

a mobile device having an input manager operating in accord with software instructions, said input manager for accessing a user's contacts and monitoring interactions between the user and those contacts so as to receive at least one action and to receive information from a cellular infrastructure;

a classification manager operating in accord with software instructions and operatively connected to the input manager and receiving the at least one action and the information from the cellular infrastructure, the classification manager for updating at least one of a profile classification, a relationship classification, or a network classification in response to the at least one action and in response to the information from the cellular infrastructure; and a database operatively connected to and storing the profile classification, the relationship classification, and the network classification in accord with software instructions;

wherein the at least one action is any one of a set of acts that impact on a profile classification, a relationship classification, or a network classification;

wherein the information from the cellular infrastructure indicates whether the user and a contact are on the same account; and wherein the classification manager iteratively refines the age of the user in the profile classification by feeding back information from the relationship classification based at least on the existence of a parent-child relationship in the relationship classification.

2. The system according to claim 1, further comprising an alerts subsystem for generating alerts based on the content of the profile classification.

3. The system according to claim 2, wherein the alerts subsystem generates alerts based on the contents of the relationship classification and the network classification.

4. The system according to claim 1, further including a query subsystem for interrogating the database to obtain information from at least one of the profile classification, the relationship classification, and the network classification.

5. The system according to claim 1, wherein the input manager obtains information from a cellular infrastructure, and wherein the information from the cellular infrastructure is sent to the classification manager which applies the information from the cellular infrastructure to at least one of the profile classification, the relationship classification, and the network classification.

6. The system according to claim 5, wherein the input manager obtains information from an external source, and wherein the information from the external source is sent to the classification manager which applies the information from the external source to at least one of the profile classification, the relationship classification, and the network classification.

7. The system according to claim 6, wherein the classification manager determines heuristic information from the information from an external source.

8. The system according to claim 5, wherein the classification manager determines heuristic information from the information from the cellular infrastructure.

9. The system according to claim 1, wherein the classification manager obtains heuristic information from the at least one action.

10. A system comprising non-transitory computer readable storage media comprising coded instructions to:

form an input manager in a mobile device for accessing a user's contacts, for receiving information from a cellular infrastructure and for monitoring interactions between the user and those contacts so as to receive at least one social contact action;

put into operation a database operatively storing a profile classification, a relationship classification, and a network classification; and produce a classification manager that is operatively connected to the input manager for receiving at least one social contact action and for receiving information from the cellular infrastructure, wherein the classification manager updates at least one of the profile classification, relationship classification, or network classification in the database in response to the at least one social contact action and in response to the information from the cellular infrastructure;

wherein the at least one social contact action is any one of a set of acts that impact on the profile classification, the relationship classification, or the network classification;

wherein the information from the cellular infrastructure indicates whether the user and a contact are on the same account; and wherein the classification manager iteratively refines the age of the user in the profile classification by feeding back information from the relationship classification based at least on the existence of a parent-child relationship in the relationship classification.

11. The system according to claim 10, the non-transitory computer readable storage media further comprising coded instructions to create an alerts subsystem for generating alerts based on content of the profile classification.

12. The system according to claim 11, wherein the alerts subsystem generates alerts based on content of the relationship classification or the network classification.

13. The system according to claim 10, the non-transitory computer readable storage media further comprising coded instructions to implement a query subsystem for interrogating the database to obtain information from the database.

14. The system according to claim 10, wherein the classification manager obtains heuristic information from the social contact action and updates at least one of the profile classification, relationship classification, and network classification with that heuristic information.

15. The system according to claim 10, wherein the input manager obtains information from a cellular infrastructure, and wherein the information from the cellular infrastructure is sent to the classification manager which applies the information from the cellular infrastructure to at least one of the profile classification, the relationship classification, and the network classification.

16. The system according to claim 15, wherein the input manager obtains information from an external source, and wherein the information from the external source is sent to the classification manager which applies the information from the external source to at least one of the profile classification, the relationship classification, and the network classification.

17. The system according to claim 16, wherein the classification manager produces heuristic information from the information from an external source and wherein the classification manager applies the produced heuristic information to at least one of the profile classification, the relationship classification, and the network classification.

18. The system according to claim 15, wherein the classification manager produces heuristic information from the information from the cellular infrastructure and wherein the produced heuristic information is applied to at least one of the profile classification, the relationship classification, and the network classification.

19. The system according to claim 10, wherein the mobile device includes a client manager that controls features and settings.

20. A computerized classification system comprising:

a mobile device having an input manager operating in accord with software instructions, said input manager for accessing contacts of a first person and monitoring interactions between the first person and the contacts so as to receive information related to a social interaction performed by the first person and a second person and to receive information from a cellular infrastructure;

a classification manager operating in accord with software instructions and operatively connected to the input manager and receiving the social interaction information and the information from the cellular infrastructure, the classification manager updating at least one of a profile classification of the first person, a relationship classification of the first person, and a network classification of the first person in response to the received social interaction information and the information from the cellular structure; and a database operatively connected to and storing the profile classification of the first person, the relationship classification of the first person, and the network classification of the first person in accord with software instructions;

wherein the social interaction is any one of a set of acts that impact on a profile classification, a relationship classification, or a network classification;

wherein the information from the cellular infrastructure indicates whether the first person and the second person are on the same account; and wherein the classification manager iteratively refines the age of the first person in the profile classification of the first person by feeding back information from the relationship classification of the first person based at least on the existence of a parent-child relationship between the first person and the second person in the relationship classification of the first person.

21. The system according to claim 20, wherein if the first person and the second person are on the same account, a heuristic determination is made that the first person and the second person are related.

22. The system according to claim 21, wherein the heuristic determination that the first person and the second person are related causes the classification manager to add that determination to at least one of the profile classification of the first person, the relationship classification of the first person, the network classification of the first person, the profile classification of the second person, the relationship classification of the second person, and the network classification of the second person.

23. The system according to claim 20, wherein the information from the cellular infrastructure comprises information about the social network of the first person.

24. The system according to claim 20, wherein the profile classification of the first person comprises at least one of the following: age, gender, popularity, school attended, workplace, frequency of messaging, frequency of calling, travel, location, workdays, and work hours.

25. The system according to claim 20, wherein the relationship classification of the first person comprises at least one of the following: a close friend, a co-worker, an employer, and a social status.

26. The system according to claim 20, wherein the network classification of the first person comprises information related to how the first person socially interacts with others.

27. The system according to claim 20, wherein the relationship classification of the first person comprises a type, frequency, content, and timing of social interactions.

28. The system according to claim 20, wherein the classification manager compares the relationship classification of the first person and the relationship classification of the second person with relationship classifications of others to determine if the first person and the second person have a parent-child relationship.

29. The system according to claim 20, wherein the classification manager iteratively refines the profile classification of the first person by feeding back information from the profile classification of the first person, the relationship classification of the first person, and the network classification of the first person.

30. The system according to claim 20, further comprising an alerts subsystem for generating alerts based on the content of the profile classification.

31. The system according to claim 30, wherein the alerts subsystem sends an alert in response to changes to the profile classification of the first person.

32. The system according to claim 31, wherein the second person is an adult and the alerts subsystem sends an alert in response to the first person socially interacting with an adult.

33. The system according to claim 31, wherein the alerts subsystem sends an alert in response to an existing relationship between the first person and the second person becoming hostile.

34. The system according to claim 31, wherein the alerts subsystem sends an alert in response to identity theft between the first person and the second person.

35. The system according to claim 31, wherein the alerts subsystem sends an alert in response to the second person being a new social contact of the first person.

36. The system according to claim 20, wherein the social interaction is the first person contacting the second person for the first time.

37. The system according to claim 20, wherein the social interaction is the first person adding the second person to a contact list.

38. The system according to claim 20, wherein a heuristic determination is made as to the gender of the first person based on the name of the first person.

39. The system according to claim 20, wherein the input manager seeks additional information about the second person comprising a cellular account number.

40. The system according to claim 20, wherein the input manager obtains information from an external source, and wherein the information from the external source is sent to the classification manager which applies the information from the external source to at least one of the profile classification, the relationship classification, and the network classification.

41. The system according to claim 40, wherein the information from an external source relates to an academic status of the first person.

42. The system according to claim 41, wherein the age of the first person is heuristically approximated using their academic status.

43. The system according to claim 20, further comprising a query subsystem for interrogating the database to obtain information from the database.

44. The system according to claim 43, wherein the query subsystem enables interrogating the database to obtain information from at least one of the profile classification of the first person, the relationship classification of the first person, and the network classification of the first person.

45. The system according to claim 44, wherein the query subsystem enables a parent to identify the at least one of closest relationships and outlying relationships of the first person.

* * * * *